United States Patent Office 3,444,588
Patented May 20, 1969

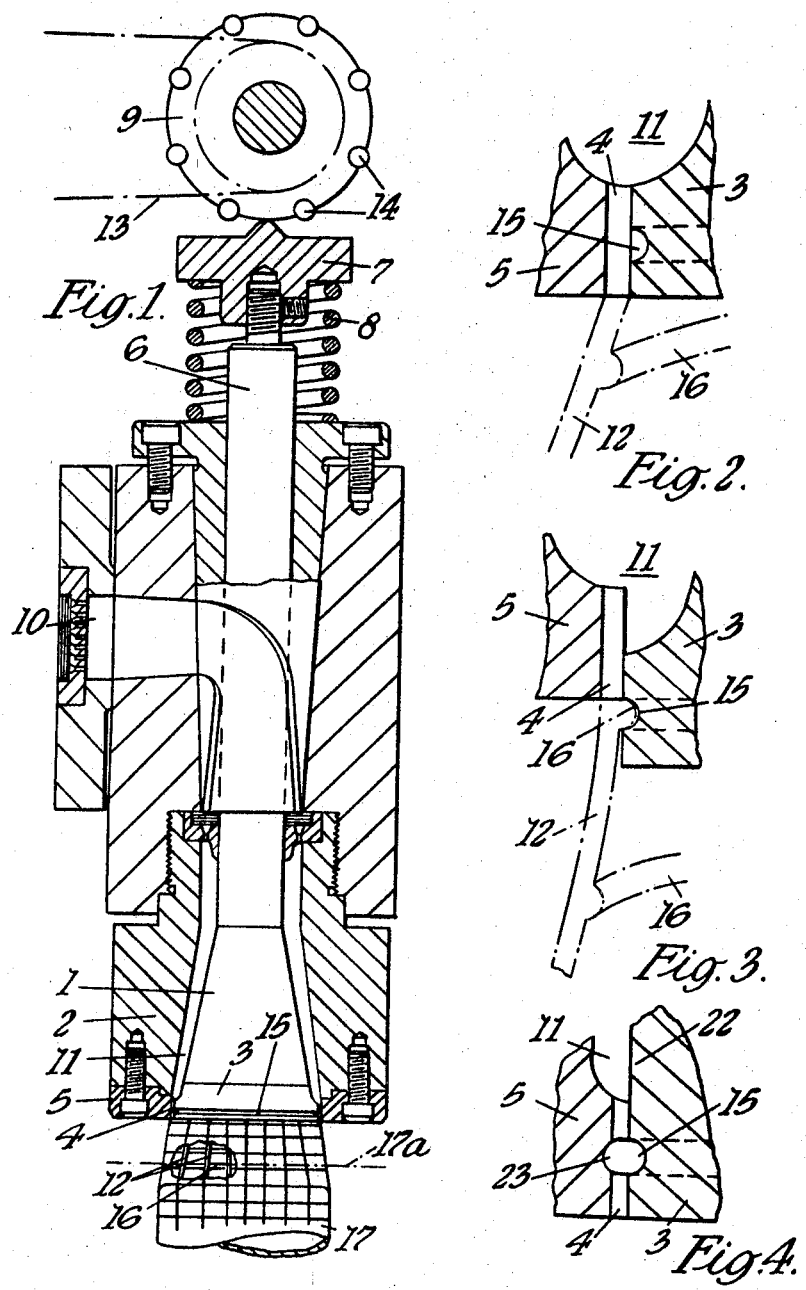

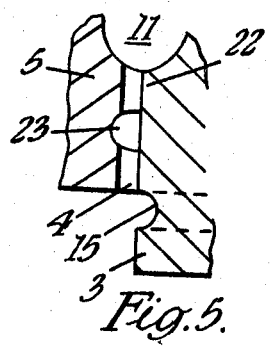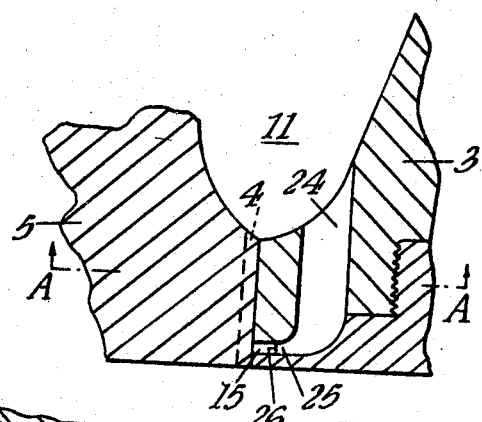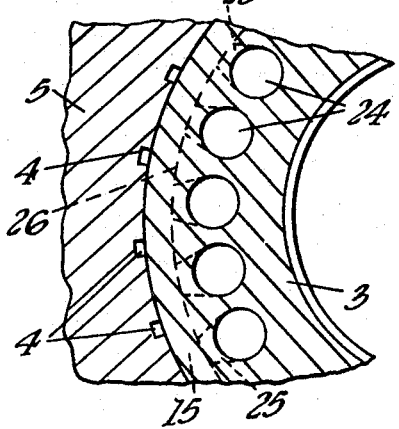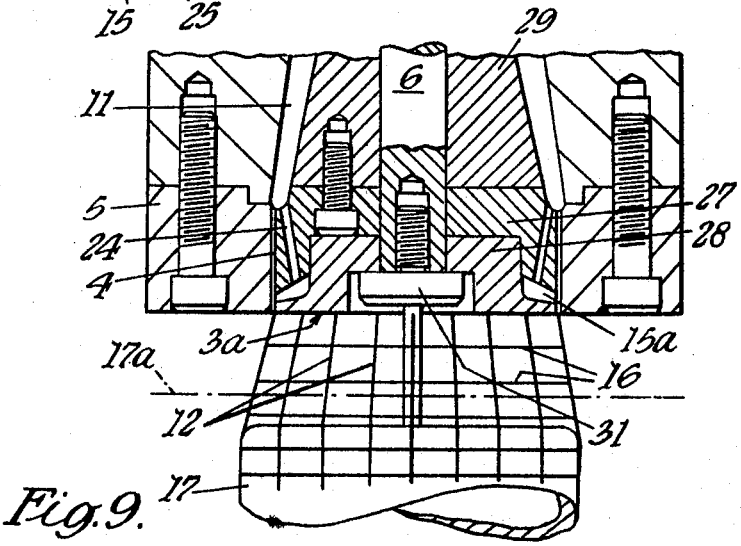

3,444,588
APPARATUS FOR MANUFACTURING PLASTIC NETS
Keith F. Martin, Darwen, and Frank Brian Mercer, Blackburn, England, assignors to Plastic Textile Accessories Limited, Blackburn, England, a British company
Filed Jan. 22, 1964, Ser. No. 339,476
Claims priority, application Great Britain, Jan. 25, 1963, 3,296/63
Int. Cl. B29d 23/04
U.S. Cl. 18—12                                                                                                   4 Claims This invention relates to apparatus for producing an extruded tubular product in the form of netting composed of plactic material.

It is an object of the present invention to produce an extruded tubular product as set forth above, wherein certain of the net strands comprise closed rings integral with the rest of the product structure and spaced axially of the tube.

It is a further object of the present invention to produce a net wherein the closed ring net strands extend at right angles to the other net strands which are circumferentially spaced around the tube and extend along the tube parallel to each other and to the direction of extrusion.

It is a still further object of the present invention to produce an extruded plastic net which is dimensionally stable in the as-extruded direction and at right angles thereto.

It is a still further object of the present invention to produce, if desired, a net as set forth in the preceding paragraphs, wherein the closed ring net strands have been subjected to a degree of melt flow orientation during the extrusion.

The present invention consists in apparatus for carrying out a method of producing an extruded tubular product in the form of netting composed of plastic material, which includes extruding through die orifice means a tubular component in the form of spaced parallel strands disposed in a nominal tubular surface, wherein closed ring strands are moulded circumferentially and integrally with the tubular component strands in an annular mould groove which is cyclically displaced clear of the die orifice means to a position whereat each moulded closed ring strand is stripped from the mould groove as an integral part of the net product.

The invention further consists in apparatus for carrying out a method of producing an extruded tubular product in the form of netting composed of plastic material, which includes extruding a tubular component in the form of spaced parallel strands disposed in a nominal tubular surface, and simultaneously by cyclically moulding closed ring strands circumferentially and integrally with the tubular component and cyclically displacing the closed ring strands with the tubular components to a position whereat the continued movement of the tubular product carries with it the moulded closed ring strand as an integral part of the structure disposed transversely on the structure.

The invention still further consists in apparatus for carrying out a method of producing an extruded tubular product in the form of netting composed of plastic material, which includes continuously extruding through die orifice means a tubular component in the form of spaced parallel strands disposed in a nominal tubular surface, cyclically causing the adherence to the tubular component of simultaneously pre-moulded closed ring strands formed in an annular mould located within the die orifice means and opening thereinto, and permitting each closed ring strand to be stripped from the annular mould by displacing the mould to a position external to the die orifice means whereat the tubular component carries with it the integral moulded closed ring strand.

The invention still further consists in apparatus for carrying out a method of producing an extruded tubular product in the form of netting composed of plastic material, as set forth in any of the three preceding paragraphs, wherein the plastic material forming the closed ring strands is subjected to melt flow orientation during the moulding thereof.

The invention further consists in an apparatus for producing an extruded tubular product in the form of netting composed of plastic material, which includes a circular series of die orifice means for continuously extruding a tubular component in the form of spaced parallel strands disposed in a nominal tubular surface, an annular mould groove in co-axial juxtaposition with said circular series of die orifice means for moulding closed ring strands integrally with the tubular component, and means for cyclically displacing the mould groove axially of said circular series of die orifice means to a position whereat each moulded closed ring strand may be stripped from the mould groove as an integral part of the product by the continued axial movement of the product.

The invention still further consists in apparatus as set forth in the preceding paragraph, wherein the annular mould groove is fed with plastic material by a plurality of feed ducts extending from a plastic supply chamber to or near the back of the annular mould groove and spaced circumferentially around the annular mould groove.

The invention still further consists in apparatus as set forth in the preceding paragraph, wherein the feed ducts supplying the annular mould groove are bodily and continuously rotated about the axis of the groove whereby the plastic material fed to the groove is subjected to melt flow orientation.

The invention still further consists in apparatus for producing an extruded tubular plastic product, in the form of netting, having one set of spaced parallel strands extending axially of the tube and a second set of spaced parallel closed ring strands integral with, and lying at right angles to, the axially extending set of strands wherein the plastic material of the closed ring strands has been subjected to melt flow orientation.

The invention still further consists in apparatus for producing an extruded tubular plastic product, in the form of netting, produced by the method or apparatus as set forth in any of the preceding eight paragraphs.

By the term "plastic" or "plastic material," as used herein, is meant:

(a) A synthetic thermoplastic capable of melt or compression extrusion in a molten state through dies and settable by a cooling medium on issuance from the dies. Suitable thermoplastic materials include polyamides or super-polyamides, such as nylon; polyesters; polyvinyl-chloride and copolymers thereof with vinylacetate or vinylidine chloride; and polyethylene and the like and cellulose acetate; or (b) Natural or synthetic rubbers, subsequently vulcanised or containing vulcanising agents; or (c) Those thermosetting plastic materials or mixtures thereof with thermoplastic materials, which are capable of extrusion; or (d) Expandable or foamable thermoplastic materials such as expandable polystyrene or expandable polyethylene.

In the accompanying drawings:

FIGURE 1 is a vertical section through a simplified form of the apparatus according to the present invention.

FIGURE 2 shows a portion of FIGURE 1 on an enlarged scale with the two die members in one relative position.

FIGURE 3 is similar to FIGURE 2, but shows the two die members in another relative position.

FIGURES 4 and 5 are similar to FIGURES 2 and 3 showing a modified form of the invention.

FIGURE 6 is a fragmentary section view of a modified form of the die members and the plastic supply thereto.

FIGURE 7 is a section on the line A—A of FIGURE 6.

FIGURE 9 is a section of the die means of FIGURE 8 on an enlarged scale.

Figure 8:
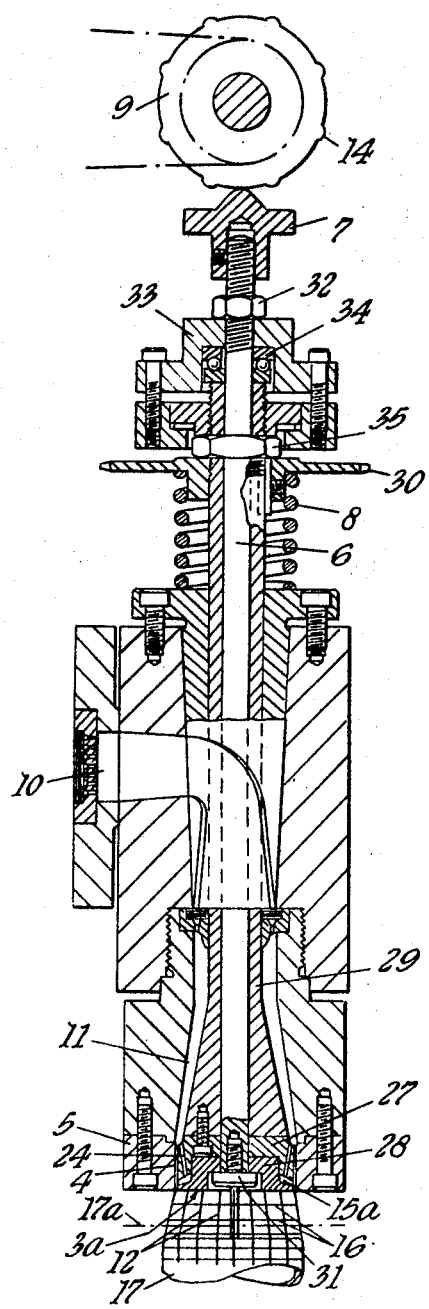
FIGURE 8 is a vertical section through a preferred form of the apparatus according to the present invention capable of providing melt flow orientation in the plastic material forming the closed ring strands of the net product.

In carrying the invention into effect according to one convenient mode by way of example, apparatus for producing plastic netting, as shown in FIGURE 1, is provided with an inner die-carrying member 1 and an outer die-carrying member 2.

The inner member 1 carries at its lower end an inner die 3, and the outer member 2 is provided with a circumferential (or circular) series of spaced die orifices 4 conveniently in the form of open sided grooves formed in an outer die 5, the die 3 and the die orifices 4 constituting the die orifice means for the extrusion of plastic material in the form of a series of spaced parallel strands 12 disposed on a nominal tubular surface.

The inner die 3 is provided with an annular mould groove 15 disposed in axial juxtaposition with the series of die orifices 4 in the outer member 3 for the purpose of moulding closed ring strands 16 integrally with and circumferentially of said series of strands 12.

The inner member 1 is provided at its upper end with a shaft 6 to the upper end of which is secured a cam follower 7. A compression spring 8 urges the cam follower 7 and shaft 6 upwardly so that the cam follower is brought into engagement with a rotary cam 9. In the position of cam 9 as shown in FIGURE 1, the inner and outer dies 3 and 5, are held in horizontal alignment as will be seen more clearly from FIGURE 2, that is to say the inner die 3 is in its uppermost position.

Under these conditions, a series of circumferentially spaced effective die orifices, for the extrusion of plastic material introduced under pressure through an inlet 10 into a plastic supply cavity 11, is defined partly by the die-orifices 4 in the outer die 5 and partly by portions of the inner die 3 adjacent the die orifices 4. Extrusions of plastic material from the cavity 11 with the dies in this position would create the series of parallel longitudinal strands 12, one strand 12 from each effective die orifice, disposed in a nominal tubular surface.

However, during the extrusion process the cam 9 is rotated continuously by means of a drive chain 13. Each time one of the protruding portions 14 of the cam 9 engages the cam follower 7, the shaft 6 and the inner die member 1 are momentarily thrust downwards axially of the series of die orifices 4, against the influence of spring 8, until the inner die 3 is in the position shown in FIGURE 3. The rate of downward movement of the inner die 3 is substantially that of the rate of extrusion of the strands 12 from the die orifices 4.

In this position, the annular groove 15, formed in the peripheral surface of the inner die 3, is located externally of the die orifice means, and the plastic material in the groove 15 which is in the form of an above-mentioned closed ring strand 16 pre-moulded and integral with the longitudinal strands 12, is carried with the longitudinal strands 12 and stripped from the groove 15 to form the transverse closed ring strands of the net product.

Upon further rotation of the cam 9, the inner die 3 is returned to the position shown in FIGURE 2, and the groove 15 is refilled with plastic material from the die orifices 4 in readiness for the delivery of a succeeding pre-moulded closed ring strand.

Therefore, each time the shaft 6 is moved downwardly during the extrusion process, a moulded closed ring strand 16 is delivered as an integral part of all of the parallel strands 12, the closed ring strand 16 lying in a plane generally at right angles to the axis of the tubular product and this generally at right angles to the strands 12.

The plastic netting composed of extruded longitudinal strands 12 and pre-moulded closed ring strands 16 is drawn off over a mandrel 17. The mandrel is of a larger diameter than that at which the tube of netting is extruded in order to facilitate the stripping of the ring strands 16 from the groove 15, as will be appreciated from FIGURE 3 where one closed ring strand 16 is shown in the act of being lifted or stripped from the groove 15.

Since each closed ring strand 16 is produced by the groove 15, the netting fabricated by this apparatus will be bi-planar, the closed ring strands 16 lying in a cylindrical plane located inside the cylindrical plane of the longitudinal strands 12.

In order to set the plastic material after it has been extruded in net form, the net is cooled before it comes into contact with the mandrel 17, so that at least a set skin has been formed on the plastic net. To this end, for example, the net passes into a water bath the level of which is indicated at 17a.

FIGURES 4 and 5 show a modified form of the invention in which the inner die 3 is extended upwardly, as at 22, so that when the inner die 3 is in the position shown in FIGURE 5 an adequate bearing surface is still provided for engagement with the outer die 5. A circumferentially-extending groove 23 is provided in the outer die 5 to facilitate filling of the groove 15 with plastic material especially when the die orifices 4 are spaced relatively far apart.

However, in order to assure an adequate feed of plastic material to the annular mould groove 15, it is preferred to provide the groove 15 with its own feed ducts 24, see FIGURES 6 and 7. Thus the feed ducts 24 are spaced around the inner periphery of the annular groove 15 communicating at one end with the plastic feed supply cavity 11 and the other end with the annular groove 15 via turned duct extensions 25 through the back wall 26 of the annular groove 15. In this form the annular groove 15 may be radially deeper than the gauge of the ring strands 16, whose dimensions radially of the extruded net tube are controlled by the dwell of the annular groove 15 in the fully displaced position of the inner die 3 (i.e. the position as shown in FIGURE 3), the return movement of the inner die 3 shearing off the inner peripheral surface of each ring strand.

The combined cross-sectional area of the feed ducts 24 is preferably substantially greater than the area of the opening of the annular groove 15 and greater than that of the longitudinal strand dies 4. By this arrangement, the annular groove 15 is fed at all times with plastic material under pressure, even when the inner die 3 is in its fully downwardly displaced position and in consequence the ring strands 16 are virtually extruded from the annular groove 15.

The net product afforded by the apparatus as described above is in tubular form with one set of strands 12 extending longitudinally and the other set extending circumferentially of the tube at regularly spaced intervals in the form of closed ring strands 16, the net meshes being square or rectangular. In the longitudinal strands 12, as extruded, the plastic material has experienced melt flow orientation due to the linear path through which the plastic material forming each strand has been constrained to pass, i.e. through the dies 4 in die member 5; however, in the closed ring strands 16 the plastic material has not experienced any such melt flow orientation since the ring strands have virtually been "cast" in the annular groove 15, whether the latter is supplied with plastic material through the upper part of the longitudinal strand dies 4 (as shown in FIGURE 2) or through the feed ducts 24 (as shown in FIGURE 6). As a result the ring strands 16 are considerably weaker than the longitudinal strands 12 and are not suitable for subsequent molecular orientation by stretching in known manner, although the longitudinal strands can be so stretched satisfactorily.

In order to overcome this disadvantage, where it is desired to provide a product with stronger ring strands 16 capable of molecular orientation by stretching, it is preferred to use the modified apparatus shown in FIGURES 8 and 9. Basically this apparatus comprises the apparatus of FIGURE 1 modified by the provision of plastic feed ducts 24 (as shown in FIGURES 6 and 7) to the annular groove 15 with further provision for bodily rotating the feed ducts 24 continuously during the reciprocation of the inner die 3 as will be described in detail below. Where the parts of the modified apparatus shown in FIGURE 8 correspond to those already described with reference to FIGURES 1 and 6, the same reference numerals will be used and the description will not be repeated except insofar as necessary.

The outer die 5 is substantially as previously described but the inner die 3a is composed of two parts 27 and 28 between which the annular groove 15a is defined. The feed ducts 24 extend through the upper part 27 of the inner die 3a from the plastic supply cavity 11 to the annular groove 15a and provide a continuous adequate supply of plastic material at all times to the annular groove 15a.

The upper part 27 of the inner die 3a is secured to a tubular shaft 29 which surrounds the shaft 6 responsible for providing the reciprocatory displacements of the inner die 3a. The tubular shaft 29 is rotatable with respect to the shaft 6 which is non-rotatable, and to this end a sprocket wheel 30 is secured to the upper end of the tubular shaft 29. A chain drive not shown is applied to the sprocket wheel 30 to turn the tubular shaft 29 and the upper part 27 of the inner die 3a at from, say, 10 to 100 revolutions per minute depending on the rate of plastic extrusion.

The lower part 28 of the inner die 3a is maintained stationary against rotation by being fixedly secured to the lower end of the shaft 6 as by a bolt 31. It is necessary to ensure that the lower part 28 does not rotate since otherwise when the inner die 3a is in its lowermost position (corresponding to the position shown in FIGURE 3), rotation of the lower part 28 would carry the ring strand 16 with it and disrupt the net.

While the two parts 27 and 28 of the inner die 3a have been referred to as upper and lower, this applies to apparatus extruding vertically downwards; where the apparatus is used horizontally the upper part 27 may be considered to be the part "upstream" of extrusion and the lower part 28 the part "downstream."

The two parts 27 and 28 of the inner die 3a are reciprocated together by a transfer of thrust downwardly by a nut 32 of the shaft 6 engaging a bush 33 and thence a thrust bearing 34 abutting the top end of the tubular shaft 29 and of thrust upwardly from the spring 8 on a nut 35 on the tubular shaft 29 and thence through the bearing 34, bush 33 and nut 32 to the shaft 6.

Since the plastic feed ducts 24 (and the upper surface of the annular groove 15a) are rotated and described above the plastic material will experience a linear (coiled) feed to the annular groove 15a and will therefore experience melt flow orientation so that the plastic material of each ring strand 16 formed in and extruded from the annular groove 15a will have been felt flow oriented and have improved strength properties rendering the net product suitable for molecular orientation by stretching not only in the longitudinal direction but also transversely of the net tube.

In further modified forms of the invention, the die orifices and/or the groove may be interchanged between the inner and outer dies, that is to say the die orifices may be provided on the inner or the outer member, and the groove on the same or opposite member as the die orifices, provided that the member carrying the groove is arranged to move downwardly to deliver the premoulded closed ring when required. Furthermore, other more elaborate arrangements may be envisaged such as partial cooperating die orifices on both inner and outer dies.

In the case of apparatus as shown in FIGURE 1 (or modified according to FIGURES 6 and 7), the abovementioned interchange is simple, but in the case of the apparatus shown in FIGURES 8 and 9 the constructional complications would probably render such a modification impractical, although in theory, it would comprise a reversal of the positions of the two part inner die and the outer die, means for reciprocating both parts of the outer die while holding the lower part of the inner die against rotation.

We claim:
1. Apparatus for producing an extruded tubular product in the form of netting composed of plastic material, which comprises, in combination a circular series of die orifice means for continuously extruding a tubular component in the form of spaced parallel strands disposed in a nominal tubular surface, an annular mould groove offset with respect to the series of die orifices and in co-axial juxtaposition to and in communication with said circular series of die orifice means for moulding closed ring strands integrally with the tubular component, means for cyclically displacing the mould groove axially of said circular series of die orifice means to a position whereat each moulded closed ring strand may be stripped from the mould groove as an integral part of the product by the continued axial movement of the product, and means including a plastic supply chamber for feeding plastic under pressure to said series of die orifice means and said mould groove.

2. Apparatus for producing an extruded tubular plastic net product as claimed in claim 1, wherein a plurality of feed ducts extend from and in communication with the plastic supply chamber and to and in communication with the annular mould groove adjacent the back of the annular mould groove, said feed ducts being spaced circumferentially around the annular mould groove.

3. Apparatus for producing an extruded tubular plastic net product as claimed in claim 2 comprising means for continuously rotating said feed ducts as an entity about the axis of the groove whereby the plastic material fed to the groove is subjected to melt flow orientation.

4. Apparatus for producing an extruded tubular plastic net product as claimed in claim 3 wherein the annular mould groove is defined between an upper part and a lower part of an axially reciprocable circular die member cooperating with said circular series of die orifice means, the upper part being provided with said feed ducts and being rotatable above the axis of the annular groove while the lower part is held against rotation.

References Cited

UNITED STATES PATENTS

| 3,070,840 | 1/1963 | Mercer | 18—12 |
| 3,218,672 | 11/1965 | Langecker | 18—14 |
| 3,252,181 | 5/1966 | Hureau | 18—12 |
| 3,193,604 | 7/1965 | Mercer. | |
| 3,384,692 | 5/1968 | Galt et al. | 264—209 X |

JULIUS FROME, *Primary Examiner.*

J. H. WOO, *Assistant Examiner.*

U.S. Cl. X.R.

264—167, 209